United States Patent

Rosynsky et al.

[11] Patent Number: 5,866,210
[45] Date of Patent: Feb. 2, 1999

[54] METHOD FOR COATING A SUBSTRATE

[75] Inventors: Victor Rosynsky, Ewing, N.J.; Douglas Min, Plano, Tex.; Paul Grabenstetter, Valley City, Ohio

[73] Assignee: Engelhard Corporation, Iselin, N.J.

[21] Appl. No.: 962,363

[22] Filed: Oct. 31, 1997

Related U.S. Application Data

[63] Continuation of Ser. No. 668,385, Jun. 21, 1996, abandoned.

[51] Int. Cl.⁶ .................................. B05D 3/00; B05D 1/18
[52] U.S. Cl. ........................ 427/294; 427/350; 427/430.1; 427/443.2; 427/238; 118/50
[58] Field of Search ..................................... 427/238, 243, 427/294, 430.1, 443.2, 350; 118/50, 50.1

[56] References Cited

U.S. PATENT DOCUMENTS

| | | |
|---|---|---|
| 3,331,787 | 7/1967 | Keith et al. . |
| 3,565,830 | 2/1971 | Keith et al. . |
| 3,904,551 | 9/1975 | Lundsager et al. . |
| 3,984,213 | 10/1976 | Kelso . |
| 4,038,939 | 8/1977 | Hoyer et al. . |
| 4,134,860 | 1/1979 | Hindin et al. . |
| 4,191,126 | 3/1980 | Reed et al. . |
| 4,329,162 | 5/1982 | Pitcher, Jr. . |
| 4,384,014 | 5/1983 | Young . |
| 4,559,193 | 12/1985 | Ogawa et al. . |
| 4,609,563 | 9/1986 | Shimrock et al. ........................ 427/8 |
| 4,714,694 | 12/1987 | Wan et al. . |
| 5,057,483 | 10/1991 | Wan . |
| 5,510,086 | 4/1996 | Hemingway et al. . |

FOREIGN PATENT DOCUMENTS

| | | |
|---|---|---|
| 1 621 395 | 6/1971 | Germany . |
| 30 34 957 A1 | 4/1982 | Germany . |
| WO 95/26941 | 10/1995 | WIPO . |
| WO 97/26226 | 7/1997 | WIPO . |

*Primary Examiner*—Michael Lusignan
*Assistant Examiner*—Bret Chen

[57] ABSTRACT

A method for coating a substrate having a plurality of channels with a coating media in which the substrate is partially immersed into a vessel containing a bath of the coating media with the volume of coating media lying above the end of the immersed substrate being sufficient to coat the substrate to a desired level. A vacuum is then applied to the partially immersed substrate at an intensity and time sufficient to draw the coating media upwardly from the bath into each of the channels to form a uniform coating profile therein.

11 Claims, 4 Drawing Sheets

METHOD FOR COATING A SUBSTRATE

This is a continuation of application Ser. No. 08/668,385 filed Jun. 21, 1996, now abn.

FIELD OF THE INVENTION

The present invention is directed to a vacuum infusion method for coating a substrate having a plurality of channels such as a monolithic substrate used in catalytic convertors.

BACKGROUND OF THE INVENTION

Catalytic convertors are well known for the removal and/or conversion of the harmful components of exhaust gases. While catalytic convertors have a variety of constructions for this purpose, one form of construction is a catalytically coated rigid skeletal monolithic substrate, or honeycomb-type element which has a multiplicity of longitudinal channels to provide a catalytically coated body having a high surface area.

The rigid, monolithic substrate is fabricated from ceramics and other materials. Such materials and their construction are described, for example, in U.S. Pat. Nos. 3,331,787 and 3,565,830 each of which is incorporated herein by reference.

The monolithic substrate and particularly the multiplicity of channels are coated with a slurry of a catalytic and/or absorbent material. While various methods are known in the art for coating a monolithic substrate with a catalytic slurry, such methods from the standpoint of cost are deficient in minimizing the amount of coating applied, especially when a costly catalytically active precious metal such as platinum, palladium or rhodium is deposited as part of the coating. Not only is it difficult to coat monolithic substrates, it is also difficult to provide a consistent and reproducible coating pattern within the channels.

One method of coating a prefabricated monolithic substrate is to pump the catalyst slurry into the respective channels and then subject the coated substrate to a drying operation. Such systems have been unsuccessful in providing a uniform coating thickness and a uniform coating profile wherein the catalyst coating is deposited over the same length of each of the channels.

It has been proposed to employ a vacuum to draw the catalyst slurry upwardly through the channels. For example, Peter D. Young, U.S. Pat. No. 4,384,014 discloses the creation of a vacuum over the monolithic substrate to remove air from the channels and then drawing the catalyst slurry upwardly through the channels. The vacuum is then broken and excess slurry is removed, preferably by gravity drainage.

James R. Reed et al., U.S. Pat. No. 4,191,126 disclose the dipping of the monolithic substrate into a slurry and then utilizing subatmospheric pressure to purge the excess coating slurry from the surfaces of the support. The applied vacuum is intended to unplug the channels so that the slurry is drawn over the surfaces of each of the channels.

An improvement in these systems is disclosed in Thomas Shimrock et al., U.S. Pat. No. 4,609,563, incorporated herein by reference. This system encompasses a method of vacuum coating ceramic substrate members with a slurry of refractory and/or catalyst metal components wherein precisely controlled, predetermined amounts of the slurry are metered for application to the ceramic monolithic substrate. The monolithic substrate is lowered into a vessel of preferably predetermined dimensions to a predetermined depth containing the precise amount of slurry which is to be coated onto the substrate. The slurry is then drawn up by a vacuum which is applied to the end of the substrate opposite to the end which is immersed in the bath. No draining or purging of excess coating slurry from the substrate is necessary nor is any pre-vacuum application step required to eliminate air.

The design of the vessel also known as a dip pan which contains the precise amount of slurry in U.S. Pat. No. 4,609,563 is desirably shaped to freely receive but closely conform to the shape of the substrate to be coated. Thus, if the monolithic substrate is in the shape of an oval, the dip pan is in the shape of an oval with slightly larger dimensions than the substrate itself.

While the '563 patent process provides a smooth coating exceeding that of the other reference processes, nonetheless, there is still difficulty in obtaining a uniform coating profile such that the coating covers the same length of each channel. In addition, because the '563 patent process prefers precisely shaped and dimensioned dip pans for each type of monolithic substrate, added expense is incurred by having to inventory a variety of different sized and shaped dip pans. Still further the dimensions of each dip pan is preferably only slightly larger than the substrate. Therefore extra care must be taken to place the fragile substrate in the dip pan so that the substrate does not accidently hit the dip pan.

It would therefore be a significant benefit in the art of coating monolithic substrates and particularly monolithic substrates for use in catalytic convertors if each channel can be coated with the same thickness of coating for the same length so as to provide a uniform coating profile in a cost effective and efficient manner.

SUMMARY OF THE INVENTION

The present invention is generally directed to a vacuum infusion method for coating monolithic substrates in a cost efficient and effective manner in which each of the channels comprising the substrate is coated with the same thickness of the coating and is characterized by a uniform coating profile. The term "uniform coating profile" as used herein means that each channel of the substrate will be coated over the same length. A uniform coating profile provides distinct advantages for catalytic convertors. First, less catalyst may be used because there is less area of overlap between successive catalyst coatings. Second, there is more precise control over the placement of the catalyst which is particularly advantageous when using multiple catalyst coating compositions. Third, by virtue of controlling coating overlap and the ability to more precisely locate the overlap within each channel, the thickness of the coating can be more precisely controlled, particularly in multicoating applications. Resistance to the flow of the gases to be treated through the substrate is thereby reduced resulting in better control over and less sever pressure drops through the channels. When such substrates are used as catalytic convertors engine performance is not diminished. As used herein the term "vacuum infusion" shall generally mean the imposition of a vacuum to infuse a coating media into a plurality of channels within a monolithic substrate.

In particular, the present invention is directed to a vacuum infusion method for coating a substrate having a plurality of channels with a coating media comprising:

a) partially immersing the substrate into a vessel containing a bath of the coating media, said vessel containing an amount of coating media sufficient to coat the substrate to a desired level without reducing the level of the coating media within the vessel to below the level of the immersed substrate;

b) applying a vacuum to the partially immersed substrate at an intensity and a time sufficient to draw the coating media upwardly from the bath into each of the channels to form a uniform coating profile therein; and c) removing the substrate from the bath.

In a preferred form of the invention, after the coating media is applied to the substrate and as the substrate is being removed from the bath, a vacuum continues to be applied to the substrate at an intensity equal to or greater than the intensity of the vacuum imposed on the partially immersed substrate.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to a vacuum infusion method for coating a monolithic substrate having a plurality of channels with a coating media, typically in the form of a slurry, by drawing the coating media upwardly through the channels by the application of a vacuum in a manner which provides a uniform coating profile within the channels.

In general, the method of the present invention is premised on the discovery that the volume of the coating media such as a catalyst and/or absorbent composition, lying above the end of the substrate immersed in the dip pan must be sufficient to coat the channels of the substrate. Thus, it is the volume of the coating media above the immersed substrate, not the dimensions of the dip pan or the immersion depth which is an essential feature of the present invention.

As a consequence of the present invention, the shape and size of the dip pan, the depth of immersion of the substrate in the coating media, the distance from the immersed substrate to the bottom of the dip pan and the amount of the coating media need not be precisely controlled. As a result, the present invention provides a system for coating monolithic substrates in a more uniform manner with less waste of coating media and substrates than previously obtained.

A suitable system for performing the present invention with modifications as more specifically described herein, is disclosed in Thomas Shimrock et al., U.S. Pat. No. 4,609,563, incorporated herein by reference.

Figure 1:
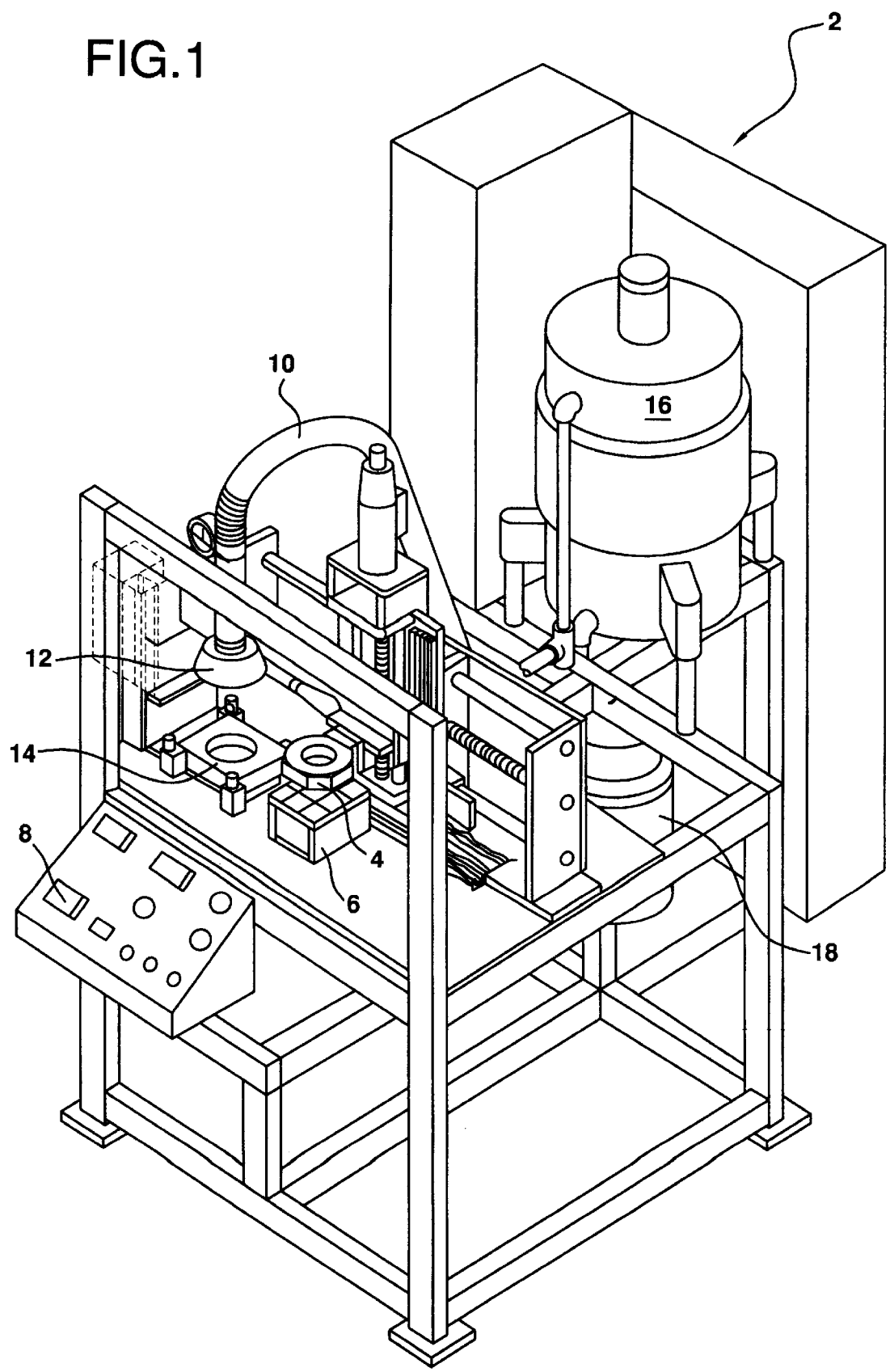
FIG. 1 is a perspective view of an assembly for coating monolithic substrates in accordance with the present invention.

Referring to FIG. 1 of the present application, the system 2 provides for manual loading of substrate, typically a monolithic substrate (not shown for the sake of clarity), to be coated into a substrate clamp 4 by placing its lower-most end on a shelf 6. The operator then pushes the start button 8 which simultaneously causes a number of operations to take place. A low intensity vacuum is initially applied through a line 10 to a vacuum cone 12 which is operatively connected to the substrate when the substrate is placed into contact with a coating media. A dip pan 14 stores the coating media received from a storage tank 16 for coating the substrate. As explained in more detail hereinafter, the amount of the coating media contained in the dip pan 14 exceeds the amount of coating media needed to complete the coating operation. The substrate is placed over the dip pan 14 by moving the substrate clamp 4 and then lowering the substrate clamp until the substrate is immersed therein for a time sufficient for the coating media to enter and be drawn upwardly into the substrate as described below.

When the substrate is initially placed within the dip pan, the coating media is typically drawn upwardly into the channels by capillary action. Once capillary movement of the coating media has commenced, an initial low intensity vacuum is imparted to the top of the substrate from a vacuum pump 18 through the vacuum cone 12 under the conditions described herein. The imposition of the low intensity vacuum further draws the coating media within the channels upwardly and additional coating media from the dip pan 14 to uniformly fill all of the channels within the substrate to a desired length.

The substrate is then lifted upwardly by the substrate clamp 4 away from the dip pan 14 and out of contact with the coated media remaining therein. While the substrate is being lifted, the vacuum pressure being applied to the substrate is retained and/or increased as the substrate is moved upwardly away from the coating media contained within dip pan. As a result, the coating within the channels is set as the rush of air through the channels at least partially dries the coating.

Figure 2:
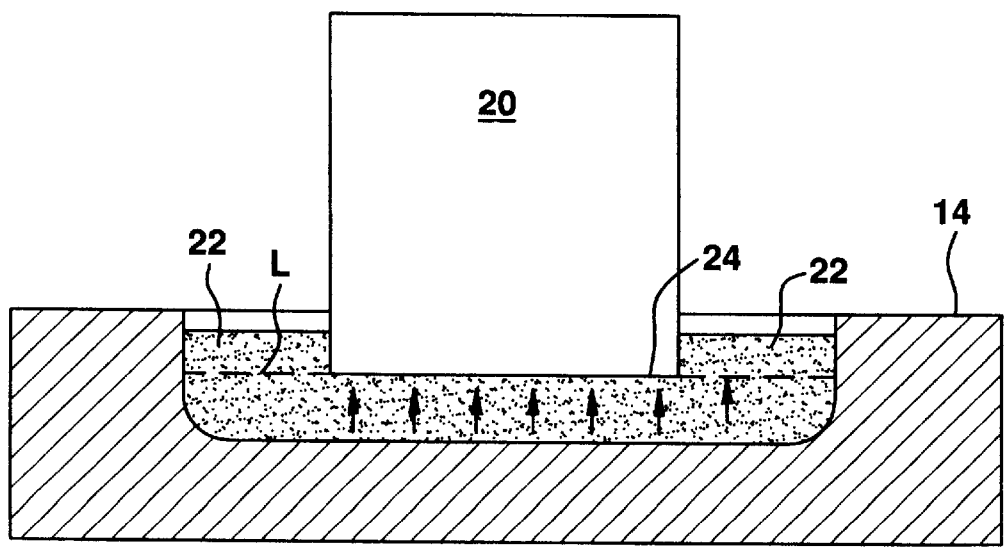
FIG. 2 is a cross-sectional view of a vessel containing a slurry for coating a monolithic substrate in accordance with the present invention.

In accordance with the present invention and as shown in FIG. 2, the dip pan 14 is loaded with an amount of coating media which exceeds the amount of coating media necessary to coat a monolithic substrate 20. Thus, the coating media need not be metered to provide an exact amount of coating media in the dip pan 14. In particular, the volume of coating media 22 lying above a line L level with the end 24 of the substrate immersed therein must be sufficient to coat the channels of the substrate 20 to the desired length. The substrate 20 may therefore be immersed in a bath of coating media to a depth sufficient to insure an adequate volume 22 of the coating media or the coating media may be continuously supplied during the coating operation to maintain the desired volume.

However, unlike prior methods, the dimensions and shape of the dip pan 14 may be varied over a wide range. Thus a single size and shape dip pan may be used to coat a wide variety of different size and shape monolithic substrates. More specifically, and with reference to FIG. 2, the depth of the coating media within dip pan, the distance between the outer surface of the substrate and the inner side surface of the dip pan, the depth of immersion of the substrate and the distance from the end 24 of the substrate 20 to the bottom of the dip pan may vary so long as the volume 22 of the coating media is sufficient to perform the coating operation.

As a consequence of the present invention, a monolithic substrate regardless of shape and size can be placed in a single size and shape dip pan and still achieve a desirable coating within the channels of the substrate. In addition, the dip pan can be sized to easily accommodate the substrate as shown in FIG. 2 to facilitate faster processing of the substrates during coating. As shown specifically in FIG. 2, the dip pan is capable of accommodating a rectangular substrate as well as oval, polygon and circular substrates which may be used from time to time for special applications.

The substrate is typically immersed into the coating media to a depth sufficient to insure a suitable volume of the coating media above the immersed end of the substrate. In most cases, the substrate is immersed in the coating media to a depth of from about 0.25 to 0.5 inch. While the substrate can be immersed to a greater depth, it is generally desirable to limit the immersion depth to minimize the extent of wasteful coating which occurs on the outside surface of the substrate.

When the substrate is placed into the coating media in accordance with the present invention, the coating media is drawn upwardly into channels 26 (See FIG. 3A) through capillary action as indicated by the arrows shown in FIG. 2 even without the imposition of a vacuum. Because there is sufficient volume of the coating media above the immersed end of the substrate, capillary action is uniformly provided to all of the channels. As a result, a uniform coating profile 28 can be initially obtained even in the absence of a vacuum.

However, it is necessary to impose a low intensity vacuum to further draw the coating media upwardly. In accordance with the present invention, the coating of media is drawn upwardly by employing excess coating media in the dip pan and maintaining the volume of the coating media above the immersed end of the substrate at a desired level in a consistent and even manner through the channels.

In accordance with the present invention, the low intensity vacuum should be maintained at no more than about 1 inch of water. If the vacuum exceeds this level, the consistency of the length and thickness of the coating may be compromised. The time the low intensity vacuum is applied will vary depending on the consistency and density of the coating media and the length the channels are to be coated. In most cases, the low intensity vacuum will be applied for from about 1 to 3 seconds. As previously indicated, a second vacuum operation of the same or higher intensity (i.e. greater that 1 inch of water, typically from about 5 to 15 inches of water) can be applied after the substrate has been removed from the coating media contained in the dip pan. The duration of the second vacuum operation is typically from about 2 to 4 seconds. In most cases the vacuum operation(s) (i.e. the sum of the first and second vacuum operations) will last for no more than a total time of about 5 seconds.

The coating once applied by the method described above, is dried before the substrate is sent to a heating section where the coating is cured. Drying of the coated substrate can be conducted in a suitable manner which may be facilitated by the imposition of a vacuum as previously described to the withdraw vapors from the channels. In most cases, the drying operation is completed within about 2.5 minutes.

Once the substrate has been coated and then dried, it is sent to a heating operation where the coating slurry is cured to provide a coated substrate ready for commercial use such as in a catalytic convertor.

It will be understood that the typical coating operation requires the immersion of one end of the substrate into the coating media followed by drying and then the insertion of the opposed end of the substrate into the coating media followed by drying and curing. The length of the coatings can be made to overlap where desired or can be spaced apart.

Monolithic substrates which can be coated in accordance with the present invention are typically made of ceramics, metals and plastics (for low temperature applications) such substrates are comprised of fine, parallel gas flow extending therethrough from an inlet face to an outlet face of the substrate so that the channels are open to air flow entering from the front and passing through the substrate and out the rear. Preferably, the channels are essentially straight from their inlet to their outlet and are defined by walls in which a coating media is coated as a wash coat so that the gases flowing through the channels contact the coating media. The flow channels are thin wall channels which can be of any suitable cross-sectional shape and size such as trapezodial, rectangular, square, sinusoidal, hexagonal, oval, circular or formed from metallic components which are corrugated and flat as are known in the art. Such structures may contain from about 60 to 600 or more gas inlet openings ("cells") per square inch of cross section. Such structures are disclosed for example in U.S. Pat. Nos. 3,904,551; 4,329,162; and 4,559,193, each of which is incorporated herein by reference.

Coating media which may be coated in accordance with the present invention can vary widely and include, but are not limited to catalyst compositions, absorbent compositions and combinations thereof customarily used for the production of catalytic conventors. Such compositions suitable as a coating media are disclosed for example in U.S. Pat. Nos. 5,057,483; 4,714,694 and 4,134,860, each of which is incorporated herein by reference.

Figure 3A:
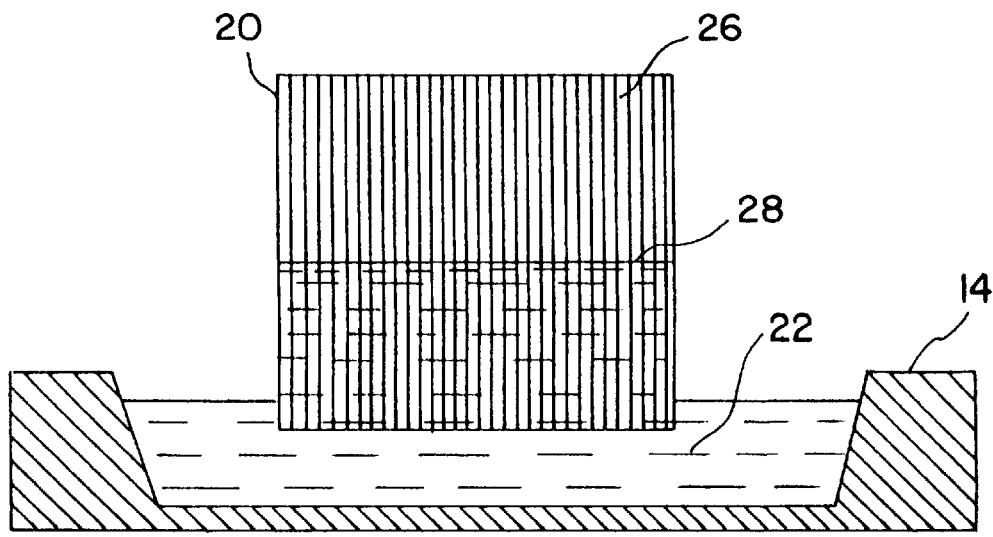
FIG. 3A is a cross-sectional view of a monolithic substrate immersed in a vessel containing a coating media showing the substrate with a uniform coating profile.
Figure 3B:
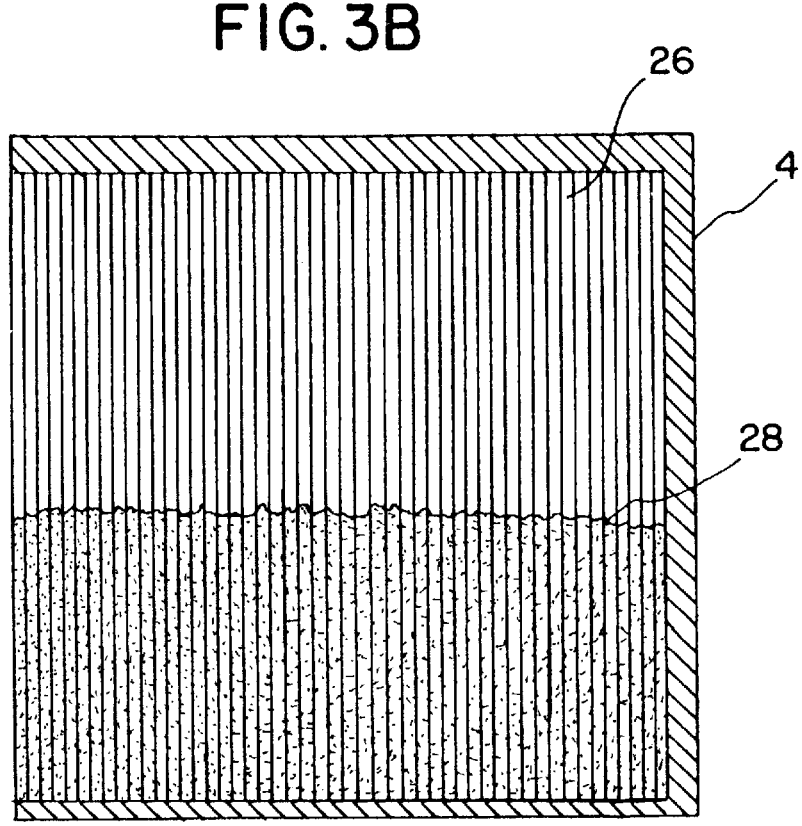
FIG. 3B is a cross-sectional view of a monolithic substrate after coating in accordance with the present invention having a uniform coating profile.

As shown in FIGS. 3A and 3B, the method of the present invention provides a uniform coating profile 28 by which each channel is coated to the approximate same length. The uniform coating profile is an important feature in the production of coated substrates, particularly for use in catalytic convertors so as to provide more exact distribution of catalysts for the conversion of noxious compounds. Because of the more precise control over the coating method, the present invention enables the production of coated substrates with more precise coating patterns including multiple layering of the coating media within a single substrate. In addition, interruptions in the coating, if desired, can be made more uniform. Still further, the thickness of the coating can be more precisely varied within all or a portion of the channels.

Figure 4A:
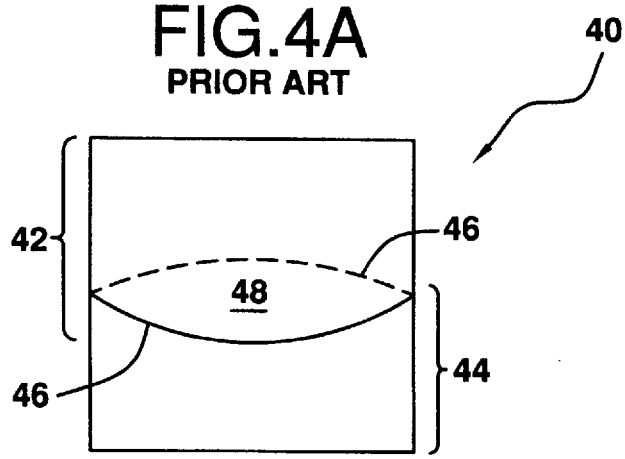
FIG. 4A is a cross-sectional view of a monolithic substrate after coating in accordance with prior art methods.

To the contrary, prior methods of coating monolithic substrates have resulted in non-uniform coating profiles, typically having a crescent shaped profile. When such a coated substrate is inverted and coated from the opposite end, a relatively large area of undesirable overlap is obtained. Referring to FIG. 4A there is shown a monolithic substrate 40 coated from both ends with respective coatings 42 and 44 with each coating having a non-uniform, crescent shaped profile 46. There results a significant area of overlap 48 indicating wasted coating media and which can have an adverse impact on the performance of the converter.

Figure 4B:
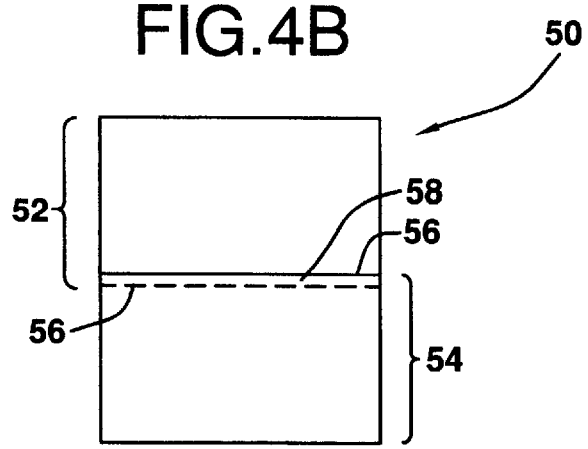
FIG. 4B is a cross-sectional view of a monolithic substrate after coating in accordance with the present invention.

As shown in FIG. 4B, coating of a monolithic substrate 50 in accordance with the present invention produces two coatings 52 and 54, respectively having a uniform coating profile 56 with an overlap area 58, if any, much smaller than obtained by prior art methods.

What is claimed is:

1. Method for coating a substrate having a plurality of channels with a coating media comprising:

a) partially immersing the substrate into a vessel containing a bath of the coating media, said vessel containing an amount of coating media in excess of the amount sufficient to coat the substrate to a desired level;

b) applying a vacuum to the partially immersed substrate at an intensity and a time sufficient to draw the coating media upwardly from the bath into each of the channels for a distance which is less than the length of the channels to form a uniform coating profile therein; and c) removing the substrate from the bath.

2. The method of claim 1 further comprising drying the coated substrate.

3. The method of claim 2 comprising after the substrate has been removed from the bath, continuing to apply a vacuum to the substrate.

4. The method of claim 3 wherein the intensity of the vacuum applied after the substrate has been removed from the bath is at least equal to the intensity of the vacuum applied to the substrate while immersed in the bath.

5. The method of claim 1 further comprising replenishing the bath with an amount of the coating media which was used to coat the substrate while the substrate is being coated.

6. The method of claim 1 comprising applying the vacuum to the partially immersed substrate for from about 1 to 3 seconds.

7. The method of claim 1 wherein the intensity of the vacuum is up to 1 inch of water.

8. The method of claim 4 wherein the intensity of the vacuum applied after the substrate has been removed from the bath is from about 5 to 15 inches of water.

9. The method of claim 4 comprising applying the vacuum after the substrate has been removed from the bath for about 2 to 4 seconds.

10. The method of claim 1 comprising immersing the substrate into the coating media to a depth of from about 0.25 to 0.5 inch.

11. A coated monolithic substrate having a uniform coating profile produced in accordance with the method of claim 1.

* * * * *